Patented Jan. 18, 1927.

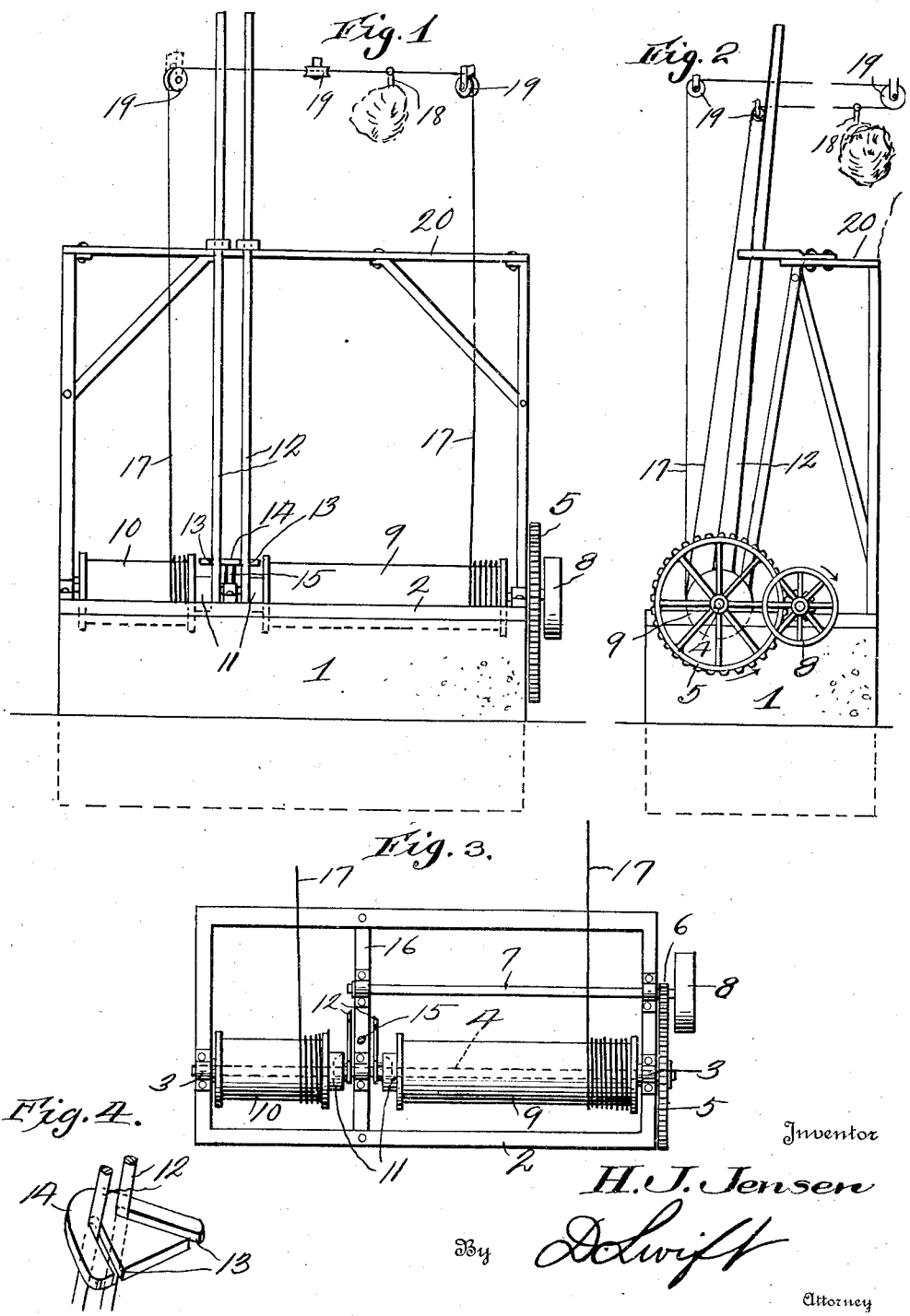

1,614,617

UNITED STATES PATENT OFFICE.

HENRY J. JENSEN, OF SCHLESWIG, IOWA.

HAY HOIST.

Application filed January 25, 1924. Serial No. 688,477.

The invention relates to hay hoists, and has for its object to provide a device of this character comprising a pair of drums rotatably mounted and adapted to impart pull on opposite ends of a cable for hoisting or lowering a hay carrier at the option of the operator.

A further object is to provide clutch means lever controlled whereby either drum may be operated as desired.

A further object is to mount the drums on a shaft and drive said shaft through gear connections with a countershaft, which countershaft is provided with a pulley whereby the device may be belted to any suitable source of power.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a front elevation of the hoist.
Figure 2 is a side elevation of the hoist.
Figure 3 is a top plan view of the hoist.
Figure 4 is a perspective view of the clutch lever guide plate.

Referring to the drawing, the numeral 1 designates a concrete base, which may be imbedded in the ground and 2 a rectangular shaped frame which forms the base of the hoist proper. Rotatably mounted in bearings 3 carried by the ends of the frame 2 is a shaft 4, which shaft has one of its ends provided with a gear 5, which is constantly driven by the pinion 6 carried by the countershaft 7, and therefore, it will be seen that the shaft 4 rotates at all times. Countershaft 7 is provided with a drive pulley 8, which may be belted to any suitable driving mechanism, for instance an internal combustion engine; however a steam engine may be used if desired. Rotatably mounted on the shaft 4 are spaced drums 9 and 10, which drums are adapted to be locked to rotate with the shaft 4 through conventional forms of clutches 11, which are controlled by the upwardly extending clutch levers 12. Levers 12 are moved laterally towards the drums 9 and 10 for clutching purposes, and are moved, when rocked, by engagement with the side walls of slots 13 in the guide plate 14. The guide plate 14 is provided with a downwardly extending arm 15, which is supported on the cross bar 16 of the frame 2. It will be seen that upon rocking of the levers 12, the clutches may be moved into or out of operation for locking either the drums 9 or 10 to the constantly rotated shaft, and consequently pulls may be imparted on the cable ends 17 as desired for moving the hay carrier 18 to any position desired. The cables 17, for purposes of illustration, are shown extending over pulleys 19, however the cables may be supported in any suitable manner. It will be seen by manipulating the levers 12, a pull may be imparted on either cable end 17, and the carrier 18 may be moved to different positions, or lowered if desired. During the operation of the device, the operator stands on the platform 20, where the position of the hay carrier 18 may be easily observed and controls the drums by grasping the upper ends of the levers.

From the above it will be seen that a cable controlled mechanism is provided for a hoist, which mechanism is simple in construction, may be easily controlled by a single operator, and a hay carrier easily hoisted and moved to the desired position.

The invention having been set forth what is claimed as new and useful is:

The combination with adjacent clutch levers movable towards and away from each other in parallel relation, of means whereby upon a pivotal movement of the clutch levers, said levers will be moved towards and away from each other, said means comprising a plate having diverging slots through which the levers extend, said levers cooperating with opposite sides of the slots through their pivotal movement.

In testimony whereof I have signed my name to this specification.

HENRY J. JENSEN.